United States Patent
Minamiura

(10) Patent No.: US 6,903,534 B2
(45) Date of Patent: Jun. 7, 2005

(54) METHOD AND APPARATUS FOR CONTROLLING COOLING AND DETECTING ABNORMALITY IN BATTERY PACK SYSTEM

(75) Inventor: Keiichi Minamiura, Toyohashi (JP)

(73) Assignee: Panasonic EV Energy Co., Ltd., Shizuoka (JP)

(*) Notice: Subject to any disclaimer, the term of this patent is extended or adjusted under 35 U.S.C. 154(b) by 0 days.

(21) Appl. No.: 10/287,642

(22) Filed: Nov. 5, 2002

(65) Prior Publication Data

US 2003/0087148 A1 May 8, 2003

(30) Foreign Application Priority Data

Nov. 6, 2001 (JP) ........................................ 2001-340660

(51) Int. Cl.$^7$ ................................................ H02J 7/04
(52) U.S. Cl. ................................ 320/150; 320/137
(58) Field of Search ............................... 320/150, 137, 320/117–119, 124–125, 132, 152–153; 429/61, 90–92, 96–100; 361/687–688, 694–695, 703; 165/80.3, 121

(56) References Cited

U.S. PATENT DOCUMENTS

| 5,744,936 A | * 4/1998 | Kawakami ................... 320/120 |
| 5,773,962 A | 6/1998 | Nor |
| 6,215,281 B1 | * 4/2001 | Koch .......................... 320/150 |
| 6,278,257 B1 | 8/2001 | Takada et al. |
| 6,281,663 B1 | * 8/2001 | Yagi et al. ................... 320/150 |
| 2001/0007728 A1 | 7/2001 | Ogata |
| 2002/0156537 A1 | * 10/2002 | Sakakibara et al. ............ 700/1 |
| 2003/0087147 A1 | 5/2003 | Minamiura |
| 2003/0129457 A1 | 7/2003 | Kawai et al. |

FOREIGN PATENT DOCUMENTS

| EP | 1085592 | 3/2001 |
| EP | 1308739 | 5/2003 |
| EP | 1328052 | 7/2003 |
| JP | 11075327 | 3/1999 |
| JP | 2002313433 A | * 10/2002 ........... H01M/10/44 |

OTHER PUBLICATIONS

Patent Abstract of Japan, vol. 1999 No. Mar. 16, 1999.

* cited by examiner

*Primary Examiner*—Donald Sparks
*Assistant Examiner*—Lawrence Luk
(74) *Attorney, Agent, or Firm*—Greenblum & Bernstein, P.L.C.

(57) ABSTRACT

When an SOC difference between battery pack blocks exceeds a threshold, or a temperature difference between the battery pack blocks exceeds a threshold, a control section changes cooling modes and cooling control maps for cooling fans of respective battery pack blocks to reduce variation in SOC and in temperature difference, thereby improving charging efficiency, and making degradation rates even, so that the life of the total battery pack system is extended.

15 Claims, 6 Drawing Sheets

Fig. 3

|  | Mode 1 (normal state) | | Mode 2 (capacity variation state) | |
|---|---|---|---|---|
| Temperature | High | Low | High | Low |
| Air flow rate | Large | Small | Middle | Middle or small |

METHOD AND APPARATUS FOR CONTROLLING COOLING AND DETECTING ABNORMALITY IN BATTERY PACK SYSTEM

The present disclosure relates to subject matter contained in priority Japanese Patent Application No. 2001-340660, filed on Nov. 6, 2001, the contents of which is herein expressly incorporated by reference in its entirety.

BACKGROUND OF THE INVENTION

1. Field of the Invention

The present invention relates to a method and an apparatus for controlling cooling and a method and an apparatus for detecting an abnormality in a battery pack system. The battery pack system is composed of a plurality of battery pack blocks, each of which is constituted by connecting a plurality of cells in series, that are connected with one another in series, in parallel, or by a combination of serial connection and parallel connection.

2. Description of Related Art

A conventional battery pack system, as shown in FIG. 6A, includes a battery pack block 11 that is composed of a plurality of cells connected in series; a cooling fan 2 for cooling the battery pack block 11; a temperature/voltage/current detecting section 13 for detecting the temperature, voltage, and current of the battery pack block 11 based on output signals of various sensors (not shown) mounted on the battery pack block 11; and a control section 14 for performing various control and alarm functions, including controlling operation of the cooling fan 2 according to the results of detection by the temperature/voltage/current detecting section 13. Reference numerals 15a and 15b denote output terminals of the battery pack block 11.

With reference to temperature control of the battery pack block 11, as shown in FIG. 6B, should the temperature of the battery pack block 11 rise, the tooling capacity will be raised almost proportionally by increasing the air flow rate from the cooling fan 2. This prevents a rise in the temperature of the battery pack block 11 from exceeding a predetermined temperature.

As an example of a specific configuration of the battery pack block 11, a battery pack block is known in which individual battery modules consist of a serially connected arrangement of, for example, six cells. The battery modules are disposed in parallel with 20 to 30 modules being serially connected. Thereby, an output voltage from one hundred and several tens of volts to several hundred volts can be obtained. To respond to the demand for battery pack systems with greater capacity and higher output, a battery pack system is considered which consists of an arrangement with a serial or parallel connection, or with a combination of serial and parallel connections, between a plurality of battery pack blocks as described above.

However, in such a battery pack system, the respective cooling fans 2 of a plurality of battery pack blocks are controlled by a single cooling mode of operation. Consequently, a variation in the temperatures of the battery pack blocks 11 cannot be avoided, causing a variation in the SOC (State of Charge) of the battery pack blocks 11, and further resulting in various degradation rates. Further, variations in the SOC due to partial replacement of the battery pack blocks 11, also result in differing degradation rates.

What is worse, variations in the temperature between the battery pack blocks 11 greatly promote degradation of some of the battery pack blocks 11. This has a negative effect on the other battery pack blocks 11, and results in a shortened life for the battery pack system.

In a method for detecting temperature abnormalities in each battery pack block 11, the difference between an estimated battery temperature and an obtained battery temperature is considered. The estimated value is obtained from a heat generation value calculated from charged and discharged capacities derived from current and voltage values, and the cooling capacity of the cooling fan 2. The actual temperature value is detected by a sensor. An abnormality in the battery pack block 11 is judged when the difference in the estimated and actual detected temperatures exceeds a threshold. However, this method necessitates the provision of a memory for the calculation of estimated temperature. This results in a higher cost and, in addition, tends to cause errors in the estimation value, giving rise to problems in the accuracy of the abnormality detection.

SUMMARY OF THE INVENTION

In light of the above-mentioned problems of the conventional art, an object of the present invention is to provide a method and an apparatus for controlling cooling and detecting an abnormality in a battery pack system. The method and apparatus increase charging efficiency by restraining variations in the SOC between battery pack blocks, extend the life of the total system by reducing variations in temperature between battery pack blocks and making the degradation rates even, and detect an abnormality in the respective battery pack blocks, all with lowered cost and higher accuracy.

According to a first aspect of the present invention, there is provided a method for controlling cooling in a battery pack system, the battery pack system being composed of a plurality of battery pack blocks, each of which is constituted by connecting a plurality of cells in series, that are connected with one another in series, in parallel, or by a combination of serial connection and parallel connection. The method includes: cooling each battery pack block in an arbitrary cooling mode selected from a plurality of cooling modes for each battery pack block; and controlling the system so that an SOC difference between the respective battery pack blocks is made equal to or smaller than a threshold by switching a cooling mode of a battery pack block when an SOC difference between the battery pack block and another battery pack block exceeds the threshold.

Further, in a battery pack system, the battery pack system being composed of a plurality of battery pack blocks, each of which is constituted by connecting a plurality of cells in series, that are connected with one another in series, in parallel, or by a combination of serial connection and parallel connection, each of the battery pack blocks is provided with an, SOC detection unit and a cooling unit, and a control section is installed for controlling respective cooling units by selecting one of a plurality of cooling modes for each cooling unit, and for controlling the cooling unit of a battery pack block by changing a cooling mode thereof, if an SOC difference between the battery pack block and another battery pack block exceeds a threshold.

Still further, if a cooling mode of a battery pack block with a higher SOC is switched to a cooling mode with a lower cooling capacity under a condition that a battery temperature is not exceeding a predetermined temperature, when the SOC of the total battery pack system is high, the battery temperature becomes high. Thus, the charging efficiency of battery pack blocks is lowered. This is effective in restraining variation in SOC.

According to a second aspect of the invention, there is provided a method for controlling cooling in a battery pack system, the battery pack system being composed of a plurality of battery pack blocks, each of which is constituted by connecting a plurality of cells in series, that are connected with one another in series, in parallel, or by a combination of serial connection and parallel connection. The method includes; cooling each battery pack block in accordance with an arbitrary control map selected from a plurality of control maps for each battery pack block; and controlling the system so that a temperature difference between the respective battery pack blocks is made equal to or smaller than a threshold by changing a control map for use in cooling a battery pack block when a temperature difference between the battery pack block and another battery pack block exceeds the threshold.

Further, in a battery pack system, the battery pack system being composed of a plurality of battery pack blocks, each of which is constituted by connecting a plurality of cells in series, that are connected with one another in series, in parallel, or by a combination of serial connection and parallel connection, each of the battery pack blocks is provided with an SOC detection unit and a cooling unit, and a control section is installed for controlling respective cooling units by selecting one of a plurality of control maps for each cooling unit, and for controlling the cooling unit of a battery pack block by changing a control map thereof, if a temperature difference between the battery pack block and another battery pack block exceeds a threshold.

Still further, the above-described control section is preferably configured to detect, as an abnormality, a temperature difference between battery pack blocks exceeding the threshold even with cooling according to a control map with a highest cooling capacity.

It is also preferable that the SOC differences between the respective battery pack blocks are preferentially controlled by the method for controlling cooling in a battery pack system according to the first aspect of the invention described above so that the SOC difference is made equal to or smaller than a threshold, and then a temperature difference between the respective battery pack blocks is controlled by the method for controlling cooling in a battery pack system according to the second aspect of the invention described above so that the temperature difference is made equal to or smaller than a threshold.

According to a third aspect of the invention, there is provided a method for detecting an abnormality in a battery pack system, the battery pack system being composed of a plurality of battery pack blocks, each of which is constituted by connecting a plurality of cells in series, that are connected with one another in series, in parallel, or by a combination of serial connection and parallel connection. The method includes: detecting, as an abnormality, a temperature difference between one battery pack block and another battery pack block exceeding a threshold.

Further, in a battery pack system, the battery pack system being composed of a plurality of battery pack blocks, each of which is constituted by connecting a plurality of cells in series, that are connected with one another in series, in parallel, or by a combination of serial connection and parallel connection, each of the battery pack blocks is provided with a temperature detection unit and a cooling unit, and an abnormality detection part is installed for detecting, as an abnormality, a temperature difference between one battery pack block and another battery pack block exceeding a threshold.

Still further, it is preferable that, when a temperature difference between one battery pack block and another battery pack block exceeds a threshold, a control map for cooling the one battery pack block is changed in cooling, and when the temperature difference between the one battery pack block and the other battery pack block exceeds the threshold even with cooling according to a control map with a highest cooling capability, an abnormality is detected.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 3 is an explanatory table showing cooling modes according to the embodiment;

FIG. 6A and FIG. 6B are diagrams showing a conventional battery pack system, wherein FIG. 6A is a block diagram schematically showing a configuration, and FIG. 6B is an explanatory diagram showing a control map of air flow rate for temperature in cooling control.

DETAILED DESCRIPTION OF THE PREFERRED EMBODIMENTS

An embodiment of a method and an apparatus according to the present invention, for controlling cooling and detecting an abnormality in a battery pack system, will be described below with reference to FIG. 1 to FIG. 4D.

Figure 1:
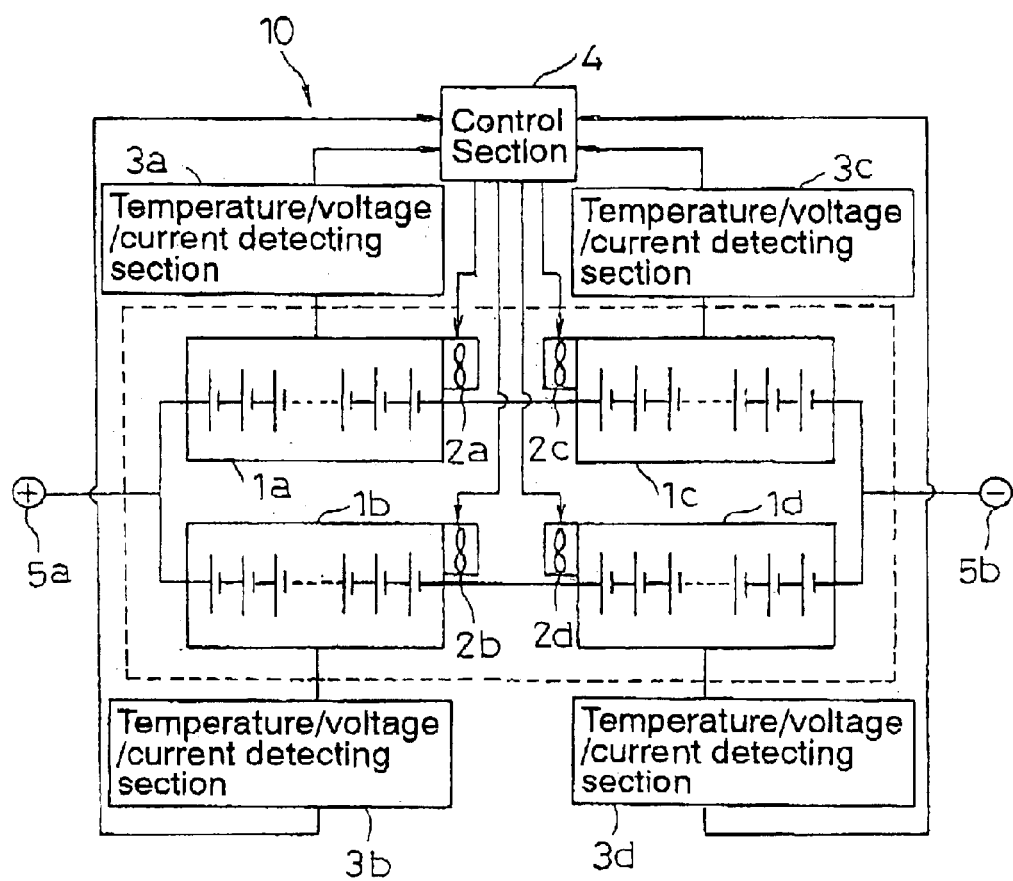
FIG. 1 is a block diagram schematically showing the structure of a battery pack system according to one embodiment of the present invention.

In FIG. 1, a battery pack system 10 includes four battery pack blocks 1a to 1d, each of which is constituted by connecting a plurality of cells in series. The battery pack blocks 1a and 1c, as well as 1b and 1d, are connected in series, thereby constituting two battery pack block groups. These battery pack block groups are connected in parallel, whereupon the battery pack system 10 is realized. The battery pack blocks 1a to 1d are each constructed as follows. For example, six cells are connected together in series so as to provide a battery module, and 20 to 30 units of such battery modules are disposed in parallel and connected in series. The battery pack blocks 1a to 1d are provided with cooling fans 2a to 2d as a cooling unit, respectively, for cooling purposes.

Corresponding to each of the battery pack blocks 1a to 1d, there are temperature/voltage/current detecting sections 3a to 3d. These are provided to detect temperatures, voltages, and currents of the battery pack blocks 1a to 1d based on the output signals of various sensors (not shown) respectively mounted thereon. The results of the detection by the respective temperature/voltage/current detecting sections 3a to 3d are inputted to a control section 4 which carries out various control and alarm functions for each of the battery pack blocks 1a to 1d. This is according to the results of the detection and, in addition, control extends to operational control of the cooling fans 2a to 2d. Reference numerals 5a and 5b denote output terminals of the battery pack system 10.

Next, cooling control and abnormality detection operations by the control section 4 described above will be explained with reference to FIG. 2 to FIG. 4D.

The control section 4 calculates the SOC of each of the battery pack blocks 1a to 1d from an input voltage, a current value, and the like, and then calculates differences in the capacity between the battery pack blocks. The control section 4 also computes differences in temperatures between the battery pack blocks 1a to 1d, based on the input temperatures thereof.

Further, in the control section 4 as shown in FIG. 3, mode 1 and mode 2 are set as cooling modes. The mode 1 represents a normal state and the mode 2 represents a case where there is a variation in capacity. The control section 4 is set such that the control section 4 is able to greatly change the air flow rate when in mode 1. This change ranges from a high flow rate to a low flow rate according to temperatures of the battery pack blocks. In contrast, when in mode 2, the control section 4 changes the air flow rate by a lesser degree. This ranges from a medium flow rate to a low flow rate according to temperatures of the battery pack blocks.

Still further, in the control section 4 as shown in FIG. 4A to FIG. 4D, MAP 1 to MAP 4 are set so as to specify changes in the air flow rate according to temperature. Firstly, MAP 1, which is for the first stage with the lowest air flow rate (representing a low cooling capacity) is selected. This is then changed to MAPs 2 through 4 for the second through fourth stages with increasingly greater air flow rates. Actual air flow rate data output from the control section 4 to control the cooling fans 2a to 2d is determined as a product of the cooling modes (1 or 2) and MAPs 1 to 4.

Figure 2:
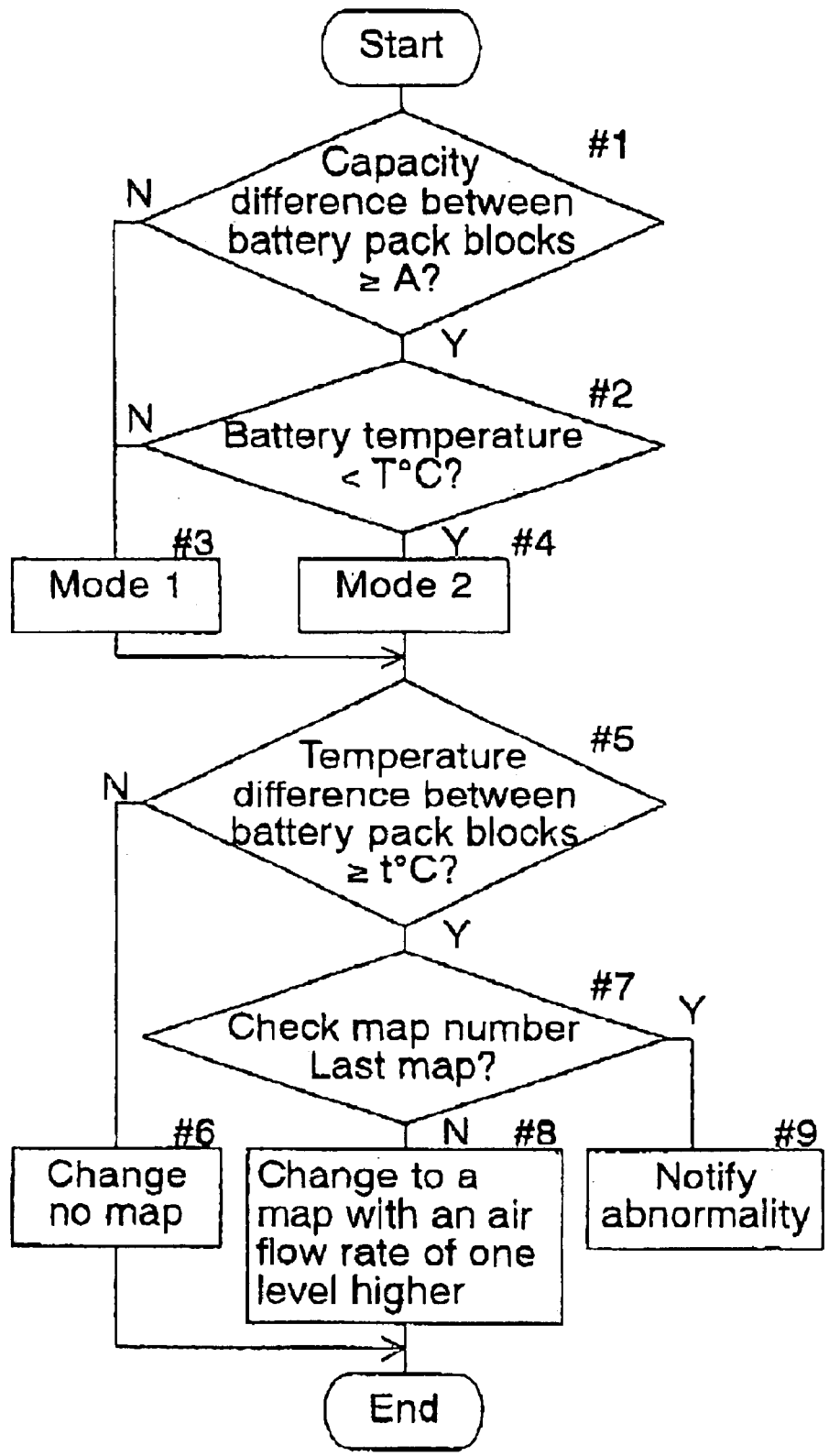
FIG. 2 is a flow chart of a control by a control section according to the embodiment.
Figure 4A:
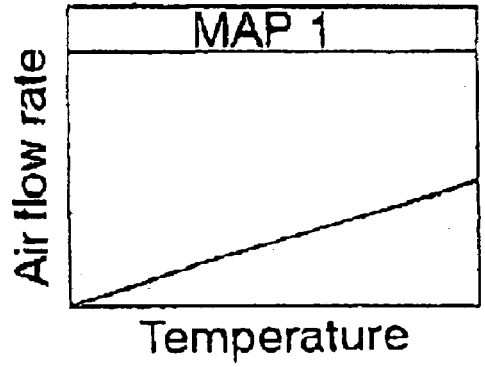
FIG. 4A through FIG. 4D are diagrams showing control maps of air flow rates according to the embodiment.
Figure 4B:
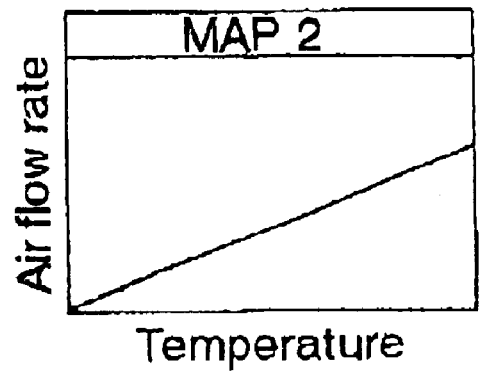
Figure 4C:
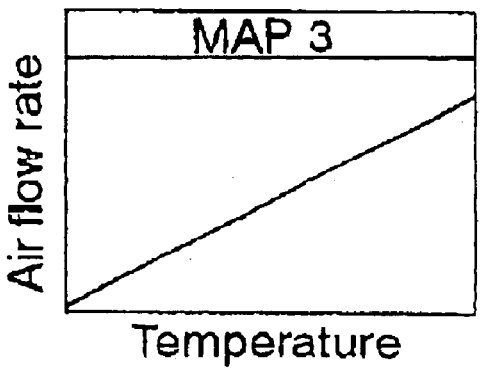
Figure 4D:
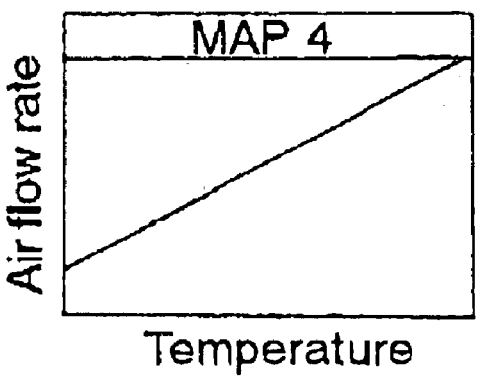

Control of operation of the respective cooling fans 2a to 2d and notification of abnormality is performed at predetermined intervals according to a flow chart in FIG. 2, and which will now be described below.

Firstly, in step #1, it is judged whether each capacity (SOC) difference between respective battery pack blocks 1a to 1d is equal to or greater than a predetermined threshold 'A'. If the difference is smaller than the threshold 'A', the process proceeds to step #3, which sets the cooling mode to mode 1. If the difference is equal to or greater than the threshold 'A', it is then judged in step #2 whether the battery temperature is lower than 'T' degrees C. (e.g. 50 degrees C.). The temperature 'T' has been set as a temperature value wherein temperatures equal to or higher than 'T' are not preferable. If the battery temperature is equal to or higher than 'T' degrees C., the process proceeds to step #3 and sets the cooling mode to mode 1. If the battery temperature is lower than 'T' degrees C., the process proceeds to step #4 and sets the cooling mode to mode 2.

Next, in step #5 and with reference to the respective battery pack blocks 1a to 1d, it is judged whether the temperature difference of each battery pack block when compared with the temperature of the battery pack block having the lowest temperature is equal to or greater than a predetermined threshold 't' degrees C. If the temperature difference is smaller than the threshold of 't' degrees C., the process proceeds to step #6 to continue operational control of the cooling fans 2a to 2d without changing the MAP. On the other hand, if the temperature difference is equal to or greater than the threshold of 't' degrees C., then the number of the MAP currently used is checked. If the MAP number is 4, which is the number of the MAP with the highest air flow rate, the process proceeds to step #9 to perform an abnormality notification. This is because it is possible that the temperature of the battery pack block becomes too high and disables cooling control. If the last MAP 4 is not in use, the process proceeds to the step #8 to change the control MAP to a MAP with an air flow rate one level higher. It then continues cooling operation by the cooling fans 2a to 2d.

Repeating the control operations described above restricts variations in the SOC between the battery pack blocks 1a to 1d. This improves the charging efficiency and, further, reduces variations in the temperatures between the battery pack blocks 1a to 1d resulting in more even degradation rates. This extends a life of the battery pack system 10.

Further, since any abnormality is notified when the temperature difference between any battery pack block and another exceeds a threshold, it is only necessary to detect the temperature differences between the battery pack blocks 1a to 1d. This eliminates calculation memory and a program for the calculation of estimated temperatures required in the prior art. Further, as estimated values (which tend to give rise to errors) are not used, abnormalities are detected at a lower cost and with a higher accuracy.

Figure 5:
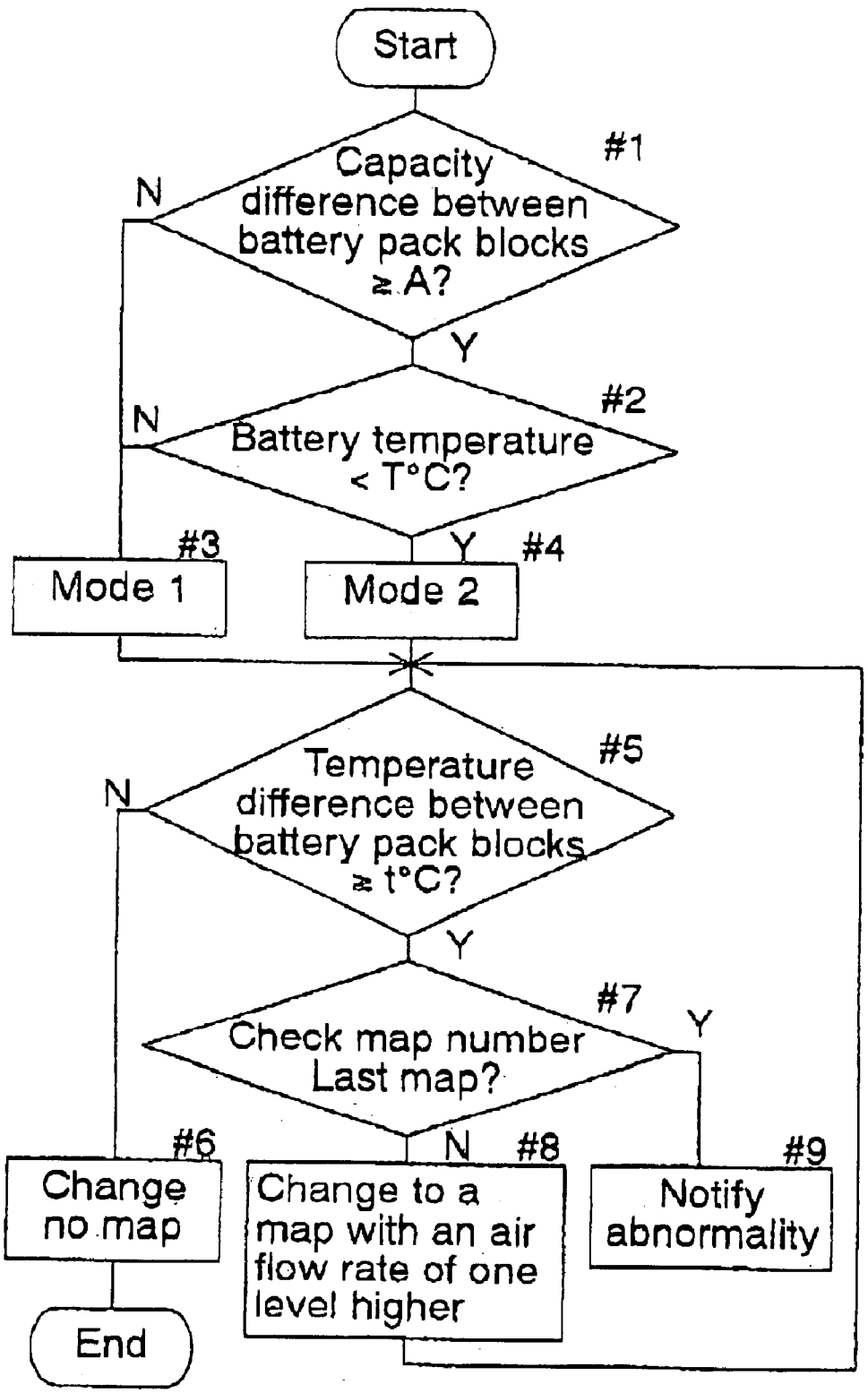
FIG. 5 is a flow chart of another control by the control section according to the embodiment.
Figure 6A:
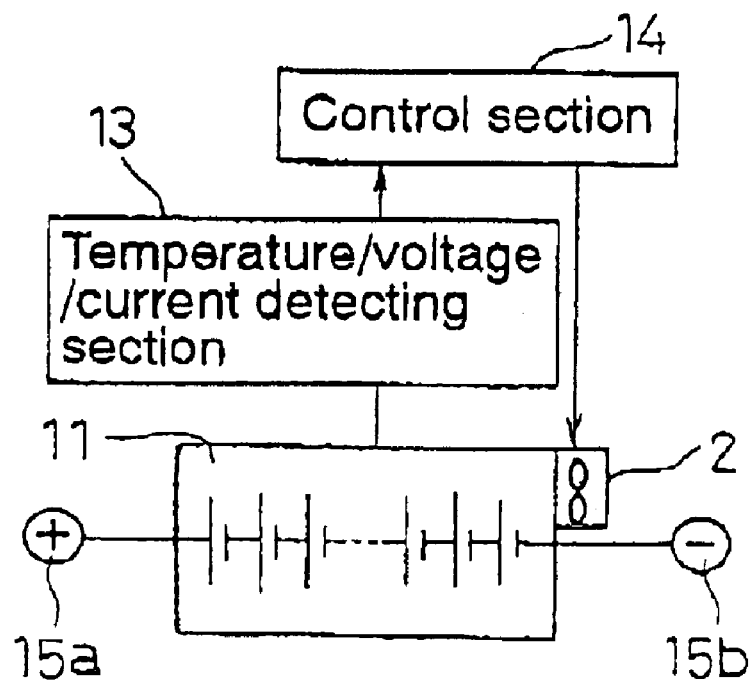
Figure 6B:
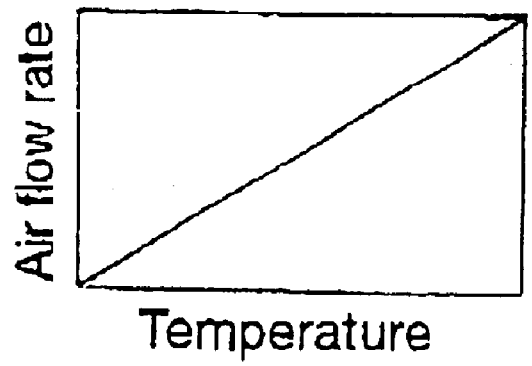

In the above-described embodiment, in steps #1 to #4, if an SOC difference between battery pack blocks exceeds a predetermined threshold, the cooling mode is changed. In steps #5 to #8, if a temperature difference between battery pack blocks exceeds a predetermined threshold, a cooling control MAP is changed. Control operations are accordingly performed at predetermined intervals. To decrease the temperature difference between the battery pack blocks, in order to prioritize even degradation rates and increased life of the total system, control can be carried out such that (as shown in FIG. 5) steps #5 to #8 are repeated until the temperature difference stops exceeding the predetermined threshold.

Further, although the above-described embodiment represents an example in which control for reducing variations in the SOC between battery pack blocks is performed in integration with control for decreasing the temperature difference between battery pack blocks, it goes without saying that the controls may be performed independently. It is also permitted to selectively perform either control depending on usage conditions, usage status, and other various conditions of the battery pack system.

While the above-described embodiment illustrates an example in which two blocks out of four battery pack blocks 1a to 1d are serially connected in pairs with the two series connected pairs then connected in parallel to form a system, it should be appreciated that the number of battery pack blocks is arbitrary—providing there is a plurality. Additionally, the connection system can employ serial, parallel, or any combination of parallel and serially connected blocks.

A method and an apparatus for controlling cooling in a battery pack system according to the present invention control the SOC differences between battery pack blocks so that the SOC differences are made equal to or smaller than a threshold, whereby variation in SOC between respective battery pack blocks is restrained to improve charging efficiency.

Further, the method and the apparatus control the temperature differences between the battery pack blocks so that the temperature differences are made equal to or smaller than a threshold, whereby variation in temperature between the battery pack blocks is reduced, and the degradation rates are made even to extend the life of the total system.

A method and an apparatus for detecting an abnormality in a battery pack system according to the invention detect only temperature differences between battery pack blocks to judge an abnormality, whereby an abnormality is detected inexpensively and with a higher accuracy.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method for controlling cooling in a battery pack system, the battery pack system comprising a plurality of battery pack blocks connected with one another in series, in parallel, or by a combination of serial connection and parallel connection, each of the battery pack blocks having a cooling unit and comprising a plurality of cells connected in series, the method comprising:
   selecting a cooling mode from a plurality of cooling modes associated with the cooling unit of each battery pack;
   cooling each of the battery pack blocks in the cooling mode selected from a plurality of cooling modes for each battery pack block; and
   controlling the system so that a state of charge difference between the battery pack blocks is made equal to or smaller than a threshold, when a state of charge difference between one battery pack block and another battery pack block exceeds the threshold, by switching a cooling mode of the one battery pack block.

2. The method for controlling cooling in a battery pack system according to claim 1, further comprising switching a cooling mode of a battery pack block with a higher state of charge to a cooling mode with a lower cooling capacity when a battery temperature does not exceed a predetermined temperature.

3. A method for controlling cooling in a battery pack system, the method comprising:
   controlling a state of charge difference between battery pack blocks in accordance with the method for controlling cooling in a battery pack system according to claim 1 so as to make the state of charge difference equal to or smaller than a threshold; and
   controlling a temperature difference between the battery pack blocks in accordance with a method for controlling cooling in a battery pack system so as to make the temperature difference equal to or smaller than a threshold.

4. A method for controlling cooling in a battery pack system, the battery pack system comprising a plurality of battery pack blocks connected with one another in series, in parallel, or by a combination of serial connection and parallel connection, each of the battery pack blocks comprising a plurality of cells connected in series, the method comprising:
   selecting a control map from a plurality of control maps for each battery pack block;
   cooling each of the battery pack blocks in accordance with the control map selected from a plurality of control maps for each battery pack block; and
   controlling the battery pack system so that a temperature difference between the battery pack blocks is made equal to or smaller than a threshold, when a temperature difference between one battery pack block and another battery pack block exceeds the threshold, by changing the control map for use in cooling the one battery pack block.

5. The method for controlling cooling in a battery pack system according to claim 4, further comprising changing a control map of a cooling unit of a battery pack block with a higher temperature to a control map with a higher cooling capacity.

6. The method for controlling cooling in a battery pack system according to claim 4, each of said plurality of control maps defining a different relationship between air flow rate and temperature.

7. A method for detecting an abnormality in a battery pack system, the battery pack system comprising a plurality of battery pack blocks connected with one another in series, in parallel, or by a combination of serial connection and parallel connection, each of the battery pack blocks comprising a plurality of cells connected in series, the method comprising:
   providing a plurality of selectively useable control maps for each battery pack block;
   detecting, as an abnormality, a temperature difference between one battery pack block and another battery pack block exceeding a threshold based upon the selected control map of the plurality of control maps.

8. The method for detecting an abnormality in a battery pack system according to claim 7, wherein, when the temperature difference between the one battery pack block and the other battery pack block exceeds the threshold, a control map for cooling the one battery pack block is changed, and when the temperature difference exceeds the threshold even with a cooling according to a control map with a highest cooling capability, an abnormality is detected.

9. The method for detecting an abnormality in a battery pack system according to claim 7, each of said plurality of control maps defining a different relationship between air flow rate and temperature.

10. An apparatus for controlling cooling in a battery pack system, the battery pack system comprising a plurality of battery pack blocks connected with one another in series, in parallel, or by a combination of serial connection and parallel connection, each of the battery pack blocks comprising a plurality of cells connected in series, the apparatus comprising a control section, wherein each of the battery pack blocks is provided with a state of charge detecting unit and a cooling unit, and the control section controls respective cooling units by selecting one of a plurality of cooling modes associated with the cooling unit of each battery pack block, and, if a state of charge difference between one battery pack block and another battery pack block exceeds a threshold, the control section controls the cooling unit of the one battery pack block by changing the cooling mode thereof to a different one of the plurality of cooling modes.

11. An apparatus for controlling cooling in a battery pack system, the battery pack system comprising a plurality of battery pack blocks connected with one another in series, in parallel, or by a combination of serial connection and parallel connection, each of the battery pack blocks comprising a plurality of cells connected in series, the apparatus comprising a control section, wherein each of the battery pack blocks is provided with a temperature detecting unit and a cooling unit, a plurality of control maps being provided for each cooling unit, and the control section controls respective cooling units by selecting one of the plurality of control maps for each cooling unit, and, if a temperature difference between one battery pack block and another battery pack block exceeds a threshold, the control section controls the cooling unit of the one battery pack block by changing the control map thereof to a different one of the control maps.

12. The apparatus for controlling cooling in a battery pack system according to claim 11, wherein the control section detects, as an abnormality, a temperature difference exceeding the threshold even with cooling according to a control map with a highest cooling capacity.

13. The apparatus for controlling cooling in a battery pack system according to claim 11, each of said plurality of control maps defining a different relationship between air flow rate and temperature.

14. An apparatus for detecting an abnormality in a battery pack system, the battery pack system comprising a plurality of battery pack blocks connected with one another in series, in parallel, or by a combination of serial connection and parallel connection, each of the battery pack blocks comprising a plurality of cells connected in series, each battery pack block having an associated plurality of control maps, the apparatus comprising an abnormality detector, wherein each of the battery pack blocks is provided with a temperature detecting unit and a cooling unit, and the abnormality detector detects, as an abnormality, a temperature difference between one battery pack block and another battery pack block exceeding a threshold, and a selector that, in response to the temperature difference exceeding the threshold, selects a different one of the plurality of control maps.

15. The method for detecting an abnormality in a battery pack system according to claim 14, each of said plurality of control maps defining a different relationship between air flow rate and temperature.

* * * * *